(12) United States Patent
Odagawa et al.

(10) Patent No.: US 7,232,862 B2
(45) Date of Patent: Jun. 19, 2007

(54) RUBBER COMPOSITION, VULCANIZATE, AND AIR INTAKE HOSE

(75) Inventors: Yoshiyuki Odagawa, Tokyo (JP); Fumio Ikeda, Tokyo (JP); Nobuyoshi Emori, Tokyo (JP); Hideyuki Fujiwara, Aichi (JP); Takashi Mizushima, Aichi (JP); Takahiro Iwata, Aichi (JP)

(73) Assignees: Zeon Corporation, Tokyo (JP); Toyoda Gosei Co., Ltd., Aichi-ken (JP)

( * ) Notice: Subject to any disclaimer, the term of this patent is extended or adjusted under 35 U.S.C. 154(b) by 132 days.

(21) Appl. No.: 10/829,228

(22) Filed: Apr. 22, 2004

(65) Prior Publication Data

US 2004/0214949 A1 Oct. 28, 2004

(30) Foreign Application Priority Data

Apr. 23, 2003 (JP) ............................. 2003-118646

(51) Int. Cl.
*C08L 51/00* (2006.01)
(52) U.S. Cl. ........................... 525/70; 525/72; 525/191
(58) Field of Classification Search ................ 525/191, 525/70; 526/338
See application file for complete search history.

(56) References Cited

U.S. PATENT DOCUMENTS 4,202,948 A * 5/1980 Peascoe ..................... 525/70
4,456,727 A * 6/1984 Middlebrook ............... 524/511
6,498,223 B2 * 12/2002 Sakata et al. ............... 526/338

FOREIGN PATENT DOCUMENTS

JP 54-106554 * 8/1979
JP 2003-246889 * 9/2003

\* cited by examiner

*Primary Examiner*—James J. Seidleck
*Assistant Examiner*—Saira B. Haider
(74) *Attorney, Agent, or Firm*—Birch, Stewart, Kolasch & Birch, LLP

(57) ABSTRACT

A rubber composition includes $\alpha,\beta$-ethylenically unsaturated nitrile-conjugated diene copolymer rubber (A), $\alpha,\beta$-ethylenically unsaturated nitrile-conjugated diene copolymer rubber (B), ethylene-$\alpha$-olefin copolymer rubber (C), and a graft copolymer (D). The graft copolymer (D) is obtained by performing graft copolymerization on a mixture of an aromatic vinyl compound and an $\alpha,\beta$-ethylenically unsaturated nitrite monomer with an ethylene-propylene-unconjugated copolymer. A content of structure units of the ethylene-propylene-unconjugated copolymer is 20 to 70 wt %, a ratio of the graft copolymer (D) with respect to 100 parts by weight in total of said rubber (A), rubber (B) and rubber (C) is 1 to 30 parts by weight. A composition ratio of the rubber (A), rubber (B) and rubber (C) is rubber (A): 20 to 79 wt %, rubber (B): 1 to 30 wt %, and rubber (C): 20 to 50 wt %.

10 Claims, No Drawings

RUBBER COMPOSITION, VULCANIZATE, AND AIR INTAKE HOSE

This Nonprovisional application claims priority under 35 U.S.C. § 119(a) on Patent Application No(s). 2003-118646 filed in JAPAN on Apr. 23, 2003, the entire contents of which are hereby incorporated by reference.

BACKGROUND OF THE INVENTION

1. Field of the Invention

The present invention relates to a rubber composition comprising α,β-ethylenically unsaturated nitrile-conjugated diene copolymer rubber and ethylene-α-olefin copolymer rubber as main components, a vulcanizate of the rubber composition, and air intake hose composed of the vulcanizate.

2. Description of the Related Art

As a rubber material having oil resistance and ozone resistance at a time, chloroprene rubber is conventionally known. However, since the chloroprene rubber includes chlorine, it may bring an environment issue. Accordingly, as a substitution of the chloroprene rubber, a rubber composition of α,β-ethylenically unsaturated nitrile-conjugated diene copolymer rubber and ethylene-α-olefin copolymer rubber has been studied. However, they are not dissolved to each other when kneading only these two kinds of rubbers, so that vulcanizate to be obtained is excellent in ozone resistance but poor in mechanical strength and flexing fatigue resistance.

Accordingly, there has been a proposal of blending chlorinated polyethylene as a compatibilizing agent in the composition of α,β-ethylenically unsaturated nitrile-conjugated diene copolymer rubber and ethylene-α-olefin copolymer rubber (refer to the patent article 1).

However, the vulcanizate obtained by vulcanizing the composition described in the patent article 1 has excellent mechanical strength but has insufficient, flexing fatigue resistance. Also, since it includes chlorine, it may bring an environment issue.

Also, there has been disclosed (refer to the patent article 2) a rubber composition which can improve heat resisting durability and oil resistance, etc. by adding a specific graft polymer to acrylonitrile-butadiene copolymer rubber (a subordinate concept of α,β-ethylenically unsaturated nitrile-conjugated diene copolymer rubber) and ethylene-propylene copolymer rubber (a subordinate concept of ethylene-α-olefin copolymer rubber). The specific graft copolymer disclosed in the patent article 2 is obtained by performing graft copolymerization on a mixture of an aromatic vinyl compound and a polar vinyl compound (a leading concept of an α,β-ethylenically unsaturated nitrile monomer) with an ethylene-propylene-unconjugated diene copolymer.

Since the vulcanizate obtained by vulcanizing the composition described in the patent article 2 does not include chloride, it does not bring any environment issues but has a problem to be solved on flexing fatigue resistance.

Patent Article 1: the Japanese Unexamined Patent Publication No. 59 (1984)-199737

Patent Article 2: the Japanese Unexamined Patent Publication No. 54 (1979)-106554

SUMMARY OF THE INVENTION

An object of the present invention is to provide a rubber composition having excellently balanced ozone resistance, flexing fatigue resistance and oil resistance and being suitable as an air intake hose material, vulcanizate of the rubber composition, and air intake hose composed of the vulcanizate.

The present inventors committed themselves to study to attain the above objects, found that a rubber composition obtained by blending liquid α,β-ethylenically unsaturated nitrile-conjugated diene copolymer rubber (B) having small molecular weight and a graft copolymer (D) including a specific amount of ethylene-propylene-unconjugated copolymer structure units in addition to solid α,β-ethylenically unsaturated nitrile-conjugated diene copolymer rubber (A) having large molecular weight and ethylene-α-olefin copolymer rubber (C) has excellently balanced ozone resistance, flexing fatigue resistance, and oil resistance, and completed the present invention.

Namely, according to the present invention, there is provided a rubber composition, including α,β-ethylenically unsaturated nitrile-conjugated diene copolymer rubber (A) having number average molecular weight of 50,000 to 150,000, α,β-ethylenically unsaturated nitrile-conjugated diene copolymer rubber (B) having number average molecular weight of 1,000 to 20,000, ethylene-α-olefin copolymer rubber (C), and a graft copolymer (D), wherein the graft copolymer (D) is obtained by performing graft copolymerization on a mixture of an aromatic vinyl compound and an α,β-ethylenically unsaturated nitrile monomer with an ethylene-propylene-unconjugated copolymer, and a content of structure units of the ethylene-propylene-unconjugated copolymer is 20 to 70 wt %;

a ratio of the graft copolymer (D) with respect to 100 parts by weight in total of the rubber (A), rubber (B) and rubber (C) is 1 to 30 parts by weight; and a composition ratio of the rubber (A), rubber (B) and rubber (C) is rubber (A): 20 to 79 wt %, rubber (B): 1 to 30 wt %, and rubber (C): 20 to 50 wt %.

Preferably, the rubber composition further includes a vulcanizing agent.

According to the present invention, there is provided vulcanizate obtained by vulcanizing the above rubber composition.

According to the present invention, there is provided air intake hose composed of the above vulcanizate.

EFFECT OF THE INVENTION

As explained above, according to the present invention, a rubber composition having excellently balanced ozone resistance, flexing fatigue resistance and oil resistance and being suitable as an air intake hose material, a vulcanizate of the rubber composition, and air intake home composed of the vulcanizate can be provided.

DESCRIPTION OF THE PREFERRED EMBODIMENT

Rubber Composition

The rubber composition according to the present invention includes

α,β-ethylenically unsaturated nitrile-conjugated diene copolymer rubber (A) having number average molecular weight of 50,000 to 150,000, α,β-ethylenically unsaturated nitrile-conjugated diene copolymer rubber (B) having number average molecular weight of 1,000 to 20,000, ethylene-α-olefin copolymer rubber (C), and a graft copolymer (D), Note that, in the explanation below, the above α,β-ethylenically unsaturated nitrile-conjugated diene copolymer rubber (A) having number average molecular weight of 50,000 to 150,000 will be referred to as rubber (A), the α,β-ethylenically unsaturated nitrile-conjugated diene copolymer rubber (B) having number average molecular weight of 1,000 to 20,000 will be referred to as rubber (B), and the ethylene-α-olefin copolymer rubber (C) will be referred to as rubber (C).

Rubber (A)

The rubber (A) used in the present invention is rubber obtained by copolymerizing α,β-ethylenically unsaturated nitrile monomer with a conjugated diene monomer.

The number average molecular weight of the rubber (A) is 50,000 to 150,000, preferably 60,000 to 120,000, more preferably 70,000 to 100,000 in polystyrene conversion by gel permeation chromatography. When the molecular weight is excessively small, mechanical strength of the vulcanizate becomes poor, while when excessively large, workability of the rubber composition as a molding material becomes poor.

A content of α,β-ethylenically unsaturated nitrile monomer units in the rubber (A) is preferably 25 to 60 wt %, more preferably 28 to 50 wt %, particularly preferably 33 to 45 wt %. When the content of the α,β-ethylenically unsaturated nitrile monomer units is excessively small, oil resistance of the vulcanizate becomes poor in some cases, while when excessively large, mechanical strength of the vulcanizate at a high temperature declines in some cases. As the α,β-ethylenically unsaturated nitrile monomer, for example, acrylonitrile, methacrylonitrile, etc. may be mentioned, and acrylonitrile is preferable.

As the conjugated diene monomer, 1,3-butadiene, isoprene, 2,3-dimethyl-1,3-butadiene, 1,3-pentadiene, etc. may be mentioned, and 1,3-butadiene is preferable.

The rubber (A) may be copolymerized with other monomers than the α,β-ethylenically unsaturated nitrile monomer and the conjugated diene monomer, which can be copolymerized with the two, within the range of not substantially inhibiting the effect of the present invention. As such a monomer, an unconjugated diene monomer, α-olefin monomer, α,β-ethylenically unsaturated mono carboxylic acid, α,β-ethylenically unsaturated polycarboxylic acid or anhydrites thereof may be mentioned. As the unconjugated diene monomer, those having the carbon number of 5 to 12 are preferable and 1,4-pentadiene, 1,4-hexadiene, vinyl norbornene, dicyclopentadiene, etc, may be mentioned. As the α-olefin, those having the carbon number of 2 to 12 are preferable, and ethylene, propylene, 1-butene, 4-methyl-1-pentene, 1-hexene, and 1-octene, etc. may be mentioned. As the α,β-ethylenically unsaturated mono carboxylic acid, acrylic acid, methacrylic acid, etc. may be mentioned. As the α,β-ethylenically unsaturated polycarboxylic acid, itaconic acid, fumaric acid, maleic acid, etc. may be mentioned. As the α,β-ethylenically unsaturated polycarboxylic acid anhydrite, itaconic anhydrite, maleic anhydrite, etc. may be mentioned.

Other than the above, the rubber (A) may be copolymerized with a copolymerizable antioxidant. As the copolymerizable antioxidant, N-(4-anilinophenyl) acrylamide, N-(4-anilinophenyl) methacrylamide, N-(4-anilinophenyl) cinnamamide, N-(4-anilinophenyl) crotonamide, N-phenyl-4-(3-vinylbenzyloxy)aniline, N-phenyl-4-(4-vinylbenzyloxy) aniline etc. may be mentioned.

A method of producing the rubber (A) is not particularly limited, and it may be produced by performing copolymerization by a known method. An emulsion polymerizing method is normally used. When producing the rubber (A) by the emulsion polymerizing method, polymerization is performed at 0 to 50° C. in a deoxygenated reactor vessel. The above monomers, an emulsifying agent, initiator and molecular weight regulator, etc. are put in the reactor vessel to react. The monomers and emulsifying agent may be added by the whole amount before the reaction, or may be added in fractional amounts after starting the reaction. After the polymerization reaction finishes, a coagulant is added to an emulsified polymerization liquid including the rubber (A) to coagulate the rubber (A), and the result is washed and dried for recovering.

Rubber (B)

The rubber (B) used in the present invention is a rubber obtained by copolymerizing an α,β-ethylenically unsaturated nitrile monomer with a conjugated diene monomer.

The number average molecular weight of the rubber (B) is 1,000 to 20,000, preferably 2,000 to 10,000, more preferably 3,000 to 7,000 in polystyrene conversion of gel permeation chromatography. When the molecular weight of the rubber (B) is too small, mechanical strength of the vulcanizate becomes poor, while when too large, workability of the rubber composition as a molding material and flexing fatigue resistance of the vulcanizate become poor.

A content of α,β-ethylenically unsaturated nitrile monomer units in the rubber (B) is preferably 15 to 60 wt %, more preferably 25 to 50 wt %, particularly preferably 30 to 45 wt %. When the content of α,β-ethylenically unsaturated nitrile monomer units is too small, oil resistance and mechanical strength of the vulcanizate become poor in some cases, while when too large, mechanical strength of the vulcanizate at a high temperature becomes poor in some cases. As the α,β-ethylenically unsaturated nitrile monomer, a conjugated diene monomer and a copolymerizable monomer with these to be used in accordance with need, those explained as other monomers to be used for the rubber (A) can be used, and preferable monomers are also the same.

A method of producing the rubber (B) is not particularly limited and it may be produced by performing copolymerization by a well known method. Generally, an emulsion polymerizing method is preferably used. When producing the rubber (B) by the emulsion polymerization method, the same method can be adopted as that in the case of producing the rubber (A) by the emulsion polymerization method except that an amount of the molecular weight regulator and preferable amounts of the respective monomers used in the polymerization are different.

Note that a pH measured when a mixture obtained by mixing only the rubber (A) and the rubber (B) to be the same composition as that in the rubber composition of the present invention is dissolved in a mixture solvent composed of tetrahydrofran and water under the given conditions below is preferably 2 to 7, more preferably 3 to 5. When the value of the pH is too small, the vulcanizing speed of the rubber composition becomes slow to result in polluting a metal, etc. in some cases, while when too large, flexing fatigue resistance of the vulcanizate becomes poor in some cases. The value of the pH is a value obtained by putting an electrode of a pH meter in a solution, wherein 6 g of the mixture of the rubber (A) and the rubber (B) is dissolved in 100 g of tetrahydrofran, dropping 2 ml of distilled water while agitating, and measuring two minutes after finishing the dropping.

It is sufficient when the above pH value becomes a value in the above preferable range when measuring the mixture of the rubber (A) and the rubber (B) by the above measurement method. A pH of each of the rubber (A) and rubber (B) measured by the above measurement method is not particularly limited, but the pH measured by the above measurement method is preferably in a range of 2 to 7 and more preferably a range of 3 to 5 in both of the rubber (A) and the rubber (B). When pHs of both of the rubber (A) and rubber (B) are in the above range, variation of the pH measured by the above measurement method due to variation of blending ratio of the two when preparing the rubber composition of the present invention can be made small, and production thereof becomes easy.

A pH value of the above mixture of the rubber (A) and the rubber (B) can be adjusted by a kind and content of compounding agents, etc. and monomer units included in the rubbers. To make the pH fall in the above preferable range, it is preferable that the rubber (A) and the rubber (B) are blended with an acidic substance or copolymerized with a monomer which becomes acidic in a solution. As the acidic substance, hydrochloric acid, sulfuric acid, nitric acid, phosphoric acid and other inorganic acids; acetic acid, citric acid, succinate and other organic acids; aluminum sulfate, aluminum chloride, and other strong acid salts; a mixture of calcium chloride and sulfuric acid, a mixture of magnesium sulfate and hydrochloric acid, and other mixtures of a neutral substance and strong acid; etc. may be mentioned. All of these acidic substances serve as a coagulant in emulsion polymerization. As the monomer becoming acidic, $\alpha,\beta$-ethylenically unsaturated mono carboxylic acid, $\alpha,\beta$-ethylenically unsaturated polycarboxylic acid, anhydrites of $\alpha,\beta$-ethylenically unsaturated polycarboxylic acid may be mentioned.

In the case of producing the rubber (A) and the rubber (B) by emulsion polymerization, when coagulating by an acrylic coagulant, the pH measured by the above measuring method sometimes becomes alkali even when the rubber (A) and the rubber (B) includes the above monomer units exhibiting acidic. In that case, it is preferable to use the above acidic substance as the coagulant.

The pH measured by the above measurement method changes in accordance with a combination of a kind and amount of an acidic substance and a monomer exhibiting acidic. To adjust the pHs of the rubber (A) and the rubber (B) to be in the above preferable range, it is necessary to determine a polymerization condition, coagulation processing condition and, if necessary, post-processing condition by a preliminary experiment, etc.

Rubber (C)

A rubber (C) used in the present invention is a rubber obtained by copolymerizing ethylene, $\alpha$-olefin and, if necessary, a monomer which can be copolymerized with these.

The number average molecular weight of the rubber (C) is preferably 50,000 to 500,000, more preferably 60,000 to 300,000, particularly preferably 70,000 to 200,000 in polystyrene conversion by gel permeation chromatography. When the molecular weight is too small, mechanical strength of vulcanizate becomes poor, while when too large, workability of the rubber composition as a molding material becomes poor.

A content of the $\alpha$-olefin unit of the rubber (C) is preferably 1 to 50 wt %, more preferably 3 to 40 wt %, and particularly preferably 5 to 30 wt %. When the content of the $\alpha$-olefin unit becomes too large, mechanical strength of the vulcanizate becomes poor, while when too small, cold resistance becomes poor.

As the $\alpha$-olefin, those having a carbon number of 3 to 20 are preferable, and 1-propen, isobutylene, 1-butene, 1-hexene, 4-methyl-1-pentene, 1-octene, etc. may be mentioned.

The rubber (C) may be obtained by copolymerizing ethylene, $\alpha$-olefin and a monomer which can be copolymerized with these within a range of not substantially inhibiting the effect of the present invention. As such a monomer, styrene, alkyl substituent styrene, and other aromatic vinyl monomers; butadiene, 1,4-haxadiane, dicyclopentadiene, and other diene monomers; cyclopentene, cyclohexene, cyclooctene, and other cycloolefin monomers may be mentioned.

A method of producing the rubber (C) is not particularly limited and it may be produced by copolymerizing by a known method. A solution polymerization method is normally used.

Graft Copolymer (D)

A graft copolymer (D) used in the present invention is obtained by performing graft copolymerization on a mixture of an aromatic vinyl compound and an $\alpha,\beta$-ethylenically unsaturated nitrile monomer with an ethylene-propylene-unconjugated diene copolymer.

As the aromatic vinyl compound, styrene, $\alpha$-methyl styrene, nucleus substitution styrene, etc. may be mentioned. Styrene is preferable among these.

As the $\alpha,\beta$-ethylenically unsaturated nitrile monomer, acrylonitrile, methacrylonitrile, etc. may be mentioned. Acrylonitrile is preferable among these.

A weight ratio of an aromatic vinyl compound and $\alpha,\beta$-ethylenically unsaturated nitrile monomer in the mixture is preferably 90:10 to 30:70. Other monomer may be included in the mixture of an aromatic vinyl compound and $\alpha,\beta$-ethylenically unsaturated nitrile monomer. As such other monomers, methyl (metha)acrylate, hydroxyethyl (metha)acrylate and other (metha)acrylic esters, may be mentioned.

A graft polymerization method is not particularly limited and a known method can be applied. Generally, a method of performing graft polymerization by emulsion polymerization in the presence of latex of an ethylene-propylene-unconjugated diene copolymer and a method of dissolving an ethylene-propylene-unconjugated diene copolymer in an organic solvent or an aromatic vinyl compound or $\alpha,\beta$-ethylenically unsaturated nitrile monomer, etc. and performing graft polymerization in the solution can be applied. Conditions of the polymerization are not particularly limited, and known conditions are applied.

In the present invention, a content of ethylene-propylene-unconjugated diene copolymer structure units in the graft copolymer (D) is 20 to 70 wt %, preferably 25 to 65 wt %, and particularly preferably 30 to 60 wt %. When the content of ethylene-propylene-unconjugated diene copolymer structure units is too small, flexing fatigue resistance of the vulcanizate cannot be improved, while when too large, oil resistance and ozone resistance become poor. The rubber composition of the present invention is particularly characterized by the point that the content of ethylene-propylene-unconjugated diene copolymer structure units in the graft copolymer (D) is limited to be within a specified range.

Ratio of Respective Components (Content in Rubber Composition)

In the rubber composition of the present invention, a ratio of the graft copolymer (D) with respect to 100 parts by weight in total of the above rubber (A), rubber (B) and rubber (C) is 1 to 30 parts by weight, preferably 2 to 20 parts by weight, particularly preferably 3 to 15 parts by weight.

The composition ratio of the rubber (A), rubber (B) and rubber (C) is the rubber (A) of 20 to 79 wt %, preferably 30 to 75 wt %, and particularly preferably 40 to 70 wt %; the rubber (B) of 1 to 30 wt %, preferably 3 to 23 wt %, and particularly preferably 5 to 15 wt %; and the rubber (C) of 20 to 50 wt %, preferably 22 to 47 wt %, and particularly preferably 25 to 45 wt %.

When an amount of the rubber (A) is too small, oil resistance of the vulcanizate becomes poor in some cases, inversely, when too large, ozone resistance becomes poor in some cases. When an amount of the rubber (B) is too small, flexing fatigue resistance of the vulcanizate becomes poor in same cases, inversely, when too large, mechanical strength becomes poor in some cases. When a content of the rubber (C) is too small, ozone resistance of the vulcanizate becomes poor in come cases, inversely, when too large, oil resistance becomes poor in some cases. When an amount of the graft copolymer (D) is too small, mechanical strength of the vulcanizate becomes poor in some cases, inversely, when too large, hardness change at a high temperature becomes poor in some cases.

Vulcanizable Rubber Composition

In the present invention, a vulcanizable rubber composition can be obtained by blending a vulcanizing agent in the above rubber composition. As the vulcanizing agent, a sulfur-based vulcanizing agent, an organic peroxide, a polyamine-based vulcanizing agent, etc. may be mentioned.

As the sulfur-based vulcanizing agent, sulfur powder, precipitated sulfur and other sulfurs; 4,4'-dithiamorpholine, tetramethylthiram disulfide, tetraethylthiram disulfide, polymer polysulfide and other organic sulfur compounds; etc. may be mentioned.

As the organic peroxide, dialkyl peroxides, diacyl peroxides, and peroxyesters, etc. may be mentioned. As the dialkyl peroxide, dicumyl peroxide, di-t-butyl peroxide, 2,5-dimethyl-2,5-di(t-butyl peroxy)-3-hexine, 2,5-dimethyl-2,5-di(t-butyl peroxy)hexane, 1,3-bis(t-butyl peroxyisopropyl)benzene, etc. may be mentioned. As the diacyl peroxide, benzoil peroxide and isobutyl peroxide, etc. may be mentioned. As the peroxyester, 2,5-dimethyl-2,5-bis(benzoil peroxy)hexane, t-butyl peroxyisopropyl carbonate, etc.), etc. may be mentioned.

A polyamine-based vulcanizing agent is a compound having two or more amino groups wherein a plurality of hydrogen of fatty hydrocarbon and aromatic hydrocarbon are substituted to be an amino group or hydrazide structure, that is, the structure expressed by $CONHNH_2$. As the polyamine-based vulcanizing agent, fatty polyamines, aromatic polyamines, compounds having two or more hydrazide structures may be mentioned. As the fatty polyamines, hexamethylene diamine, hexamethylene diamine carbamate, tetramethylene pentamine, hexamethylene diamine-cinnamaldehyde addition product, hexamethylene diamine-dibenzoate salt, etc. may be mentioned. As the aromatic polyamines, 4,4'-methylene dianiline, 4,4'-oxydiphenylamine, m-phenylenediamine, p-phenylenediamine, 4,4'-methylene bis(o-chloroaniline), etc. may be mentioned. As the compounds having two or more hydrazide structures, dihydrazide isophthalate, adipic acid dihydrazide, sebacic acid dihydrazide, etc. may be mentioned.

A blending quantity of the vulcanizing agent differs in accordance with a kind of the vulcanizing agent, but preferably 0.1 to 10 parts by weight, more preferably 0.3 to 7 parts by weight, particularly preferably 0.5 to 5 parts by weight with respect to 100 parts by weight of the rubber (A). When the blending quantity of the vulcanizing agent is too small, vulcanizing density of the vulcanizate becomes low and oil resistance becomes poor in some cases, while when too large, flexing fatigue resistance becomes poor.

When using a sulfur-based vulcanizing agent, it is normally preferable to use with a vulcanization accelerator. As the vulcanization accelerator, a zinc oxide, sulfonamide-based vulcanization accelerator, guanidine-based vulcanization accelerator, thiazole-based vulcanization accelerator, thiuram-based vulcanization accelerator, dithioic acid salt based vulcanization accelerator, etc. may be mentioned. A use amount of the vulcanization accelerator is not particularly limited and may be determined in accordance with a use object of vulcanizate, required capability, a kind of a sulfur vulcanizing agent, and a kind of the vulcanization accelerator, etc.

Also, when using an organic peroxide, it is normally preferable to use with a vulcanization auxiliary. As the vulcanization auxiliary, triaryl cyanurate, trimethylolpropane trimethacrylate, N,N'-m-phenylene bismaleimide, etc. may be mentioned. These may be dispersed in clay, calcium carbonate, silica, etc. to improve workability of a rubber composition for use. A use amount of the vulcanization auxiliary is not particularly limited and may be determined in accordance with a use object of vulcanizate, required capability, a kind of a vulcanizing agent, a kind of the vulcanization auxiliary, etc.

Other Compounding Agents

The rubber composition of the present invention may include a compounding agent used in general rubber, for example, carbon black, silica and other reinforcing agents; calcium carbonate, clay, talc, calcium silicate and other fillers; $\alpha,\beta$-unsaturated metal carboxylate; plasticizers; pigments, etc. in a range of not substantially inhibiting the effect of the present invention. Also, a rubber or resin other than the rubber (A), the rubber (B) and the rubber (C) may be included in a range of not substantially inhibiting the effect of the present invention.

Rubber Composition Preparation Method

A preparation method of the rubber composition of the present invention is not particularly limited and it may be prepared by a general preparation method of a rubber composition in the same way as other rubber compositions. It may be kneaded by using a sealed mixer or open roll, etc. Note that when blending a vulcanizing agent, vulcanization auxiliary and vulcanization accelerator, etc., it is preferable to use a method which hardly causes shearing heating so as not to progressing vulcanization while mixing. For example, it is preferable that after mixing with a Bunbary mixer without blending a vulcanizing agent, the vulcanizing agent is blended to perform final mixing with a roll.

Vulcanizate

In the present invention, the above vulcanizable rubber composition can be made to be vulcanizate by heating at a higher temperature than the vulcanization starting temperature of the vulcanizing agent included in the rubber composition.

The vulcanization temperature is preferably 100 to 200° C., more preferably 130 to 190° C., particularly preferably 140 to 180° C. in general vulcanizing agents. When the temperature is too low, it is liable that the vulcanization time becomes too long or vulcanization density becomes too low. When the temperature is too high, it is liable that defective molding is caused.

Also, the vulcanization time differs in accordance with a vulcanization method, vulcanization temperature and a molding shape of the rubber composition, etc., but a range of not shorter than one minute and not longer than five hours is preferable in terms of vulcanization density and production efficiency. Furthermore, there are cases where the inside is not sufficiently vulcanized even though the surface is vulcanized depending on the shape and size of the mold, so that secondary vulcanization may be performed.

A heating method for vulcanizing may be suitably selected from methods used for rubber vulcanization, such as press heating, vapor heating, oven heating and hot-air heating.

The above vulcanizate has excellently balanced ozone resistance, flexing fatigue resistance and oil resistance and has sufficient mechanical strength. Therefore, it is used as a roll, hose, belt, seal (for example, inlet seal) and other industrial parts and preferable as a component of vehicle rubber parts, such as packing, fuel hose, air intake hose, air duct hose, boot material (for example, CVJ boot material), oil seal, and vehicle interior parts.

Air Intake Hose

Air intake hose according to the present invention is composed of the above vulcanizate. The structure is not particularly limited, not limited to a single layer and may be a multilayer structure having two or more layers, such as other rubber layer and resin layer.

A method of producing the air intake hose according to the present invention is not particularly limited and it is produced by a conventionally known method. Preferably, it is produced by molding a vulcanizable rubber composition including the above vulcanizate to be hose having a predetermined shape by a conventionally known molding method, such as injection molding and extrusion molding, and vulcanizing by steam vulcanization or other method.

EXAMPLES

Below, the present invention will be explained specifically by examples and comparative examples. Parts and percentages below are based on weight unless otherwise mentioned.

Example 1

The rubber (A) was produced as below. 100 parts of a monomer mixture (55% of butadiene and 45% of acrylonitrile), 200 parts of ion-exchange water, 3 parts of sodium dodecylbenzenesulfonate (an emulsifying agent), 0.2 part of sodium sulfate, 0.3 part of potassium persulfate (a polymerization initiator) and 0.5 part of tert-dodecylmercaptan (a molecular weight regulator) are put in an autoclave replaced with nitride, brought to react at a reaction temperature of 30° C. until the inversion rate of the monomer reaches 85%, and the reaction was stopped by adding 0.5 part of N,N diethyl hydroxylamine. The emulsion polymerization reaction liquid was taken out, blew with steam at 100° C. to remove an unreacted monomer. 280 parts of the thus obtained emulsion polymerization liquid was added to 1000 parts of 0.5% aluminum sulfate water solution to coagulate copolymer rubber. The coagulation was sufficiently washed, dried at about 80° C. for 3 hours, so that 98 parts of acrylonitrile-butadiene copolymer rubber (A) having a number average molecular weight of 81,000 was obtained. An electrode of a pH meter was placed in a solution obtained by dissolving 6 g of the copolymer rubber in 100 g of tetrahydrofurane, 2 ml of distilled water was dropped while agitating, then, the pH was measured after 2 minutes from completion of the dropping, which was 4.2. Note that the number average molecular weight was measured by gel permeation chromatography by using tetrahydrofurane as a solvent as a standard polystyrene conversion value. The same procedure was taken for the later explained rubber (B).

The rubber (B) was produced as below. 100 parts of a monomer mixture (67% of butadiene and 33% of acrylonitrile), 200 parts of ion-exchange water, 5 parts of sodium dodecylbenzenesulfonate (an emulsifying agent), 0.2 part of sodium sulfate, 0.3 part of potassium persulfate (a polymerization initiator) and 8 part of tert-dodecylmercaptan (a molecular weight regulator) were put in an autoclave replaced with nitride, brought to react at a reaction temperature of 30° C. until the inversion rate of the monomer reaches 90%, and the reaction was stopped by adding 0.5 part of N,N diethyl hydroxylamine. The emulsion polymerization reaction liquid was taken out, blew with steam at 100° C. to remove an unreacted monomer. 280 parts of the thus obtained emulsion polymerization liquid was added to 1000 parts of 0.5% aluminum sulfate water solution to coagulate copolymer rubber. The coagulation was sufficiently washed, dried at about 80° C. for 3 hours, so that 98 parts of acrylonitrile-butadiene copolymer rubber (B) having a number average molecular weight of 3,000 was obtained. An electrode of a pH meter was placed in a solution obtained by dissolving 6 g of the copolymer rubber in 100 g of tetrahydrofurane, 2 ml of distilled water was dropped while agitating, then, the pH was measured after 2 minutes from completion of the dropping, which was 4.2.

The graft copolymer (D) was produced as below. 100 parts of toluene solution, wherein 50 parts of an ethylene-propylene-unconjugated diene copolymer (the product number EPT4070 made by Mitsui Chemicals) was uniformly dissolved in advance, was put in an auto clave substituted by nitride. 30 parts of styrene, 20 parts of acrylonitrile and 1 part of benzoyl peroxide (a radical initiator) were added thereto, and graft polymerization reaction was brought at 60° C. for 10 hours, furthermore, the temperature was raised to 70° C. for two hours. The polymerization rate was 95%. Toluene and a residual polymer were removed from the obtained solution by steam distillation, solidified products were finely pulverized, then, dried at 60° C. for 24 hours, and a graft copolymer (D) including an ethylene-propylene-unconjugated diene copolymer by a content (content of EPDM in table 1) of 50% was obtained.

Note that as the rubber (C), ethylene-propylene-conjugated diene rubber (EPT 4070 made by Mitsui Chemicals: an ethylene unit content of 68 mol %, iodine value of 22, and number average molecular weight of 90,000) was used.

In addition to 60 parts of the rubber (A), 10 parts of the rubber (B), 30 parts of the rubber (C) and 5 parts of the graft copolymer (D) obtained as above, 40 parts of carbon black (SIEST 3 made by Tokai Carbon CO., Ltd.), 5 parts of a plasticizer (dibutyl diglycol adipate: ADK CIZER RS-107 made by Asahi Denka Co., Ltd.), 1 part of stearic acid, 5 parts of a zinc oxide (zinc oxide No. 1 made by SEIDO CHEMICAL INDUSTRY CO., LTD.), 5 parts of naphthenic oil (Sunthene 415 made by Japan Sun Oil Co., Ltd.: a softener), and 1 part of diphenylamine derivatives (Antage OD made by Kawaguchi Chemical Industry Co., Ltd.: an anti-oxidant) were used to produce a rubber composition for air intake hose by kneading by a B-type Bunbary mixer for 5 minutes at 50° C.

The thus obtained rubber composition was blended with 1 part of sulfur (transmitted through 325 mesh), 2 parts of N-cyclohexyl-2-benzothiazolyl sulfenic amide (a vulcanization accelerator), and 0.2 part of tetraethylthiram disulfide (a vulcanization accelerator) and subjected to roll kneading at 50° C., so that a vulcanizable rubber composition was prepared.

The vulcanizable rubber composition was subjected to press vulcanization under conditions at 160° C. for 20 minutes with a pressing pressure of 10 MPa, and a vulcanized sheet for test having a thickness of 2 mm was produced. Ozone resistance, flexing fatigue resistance and oil resistance were evaluated by using the vulcanized sheet. The results are shown in Table 1.

The ozone resistance was evaluated by producing based on the JIS-K6259 a test piece described in the section JIS4 thereof, holding the same under an environment of 40° C. with ozone concentration of 80 ppm and being stretched by 40%, observing a crack arising condition after 72 hours, 144 hours and 280 hours from starting of the above held state by following the table 1 (state of cracks) in the JIS-K6259. The less the later explained cracks arise, the more superior in ozone resistance. The evaluation was indicated by abbreviations below. NC: no cracks were observed. A2 and B2: the alphabets indicate the number of cracks, that is, B is larger than A and C is larger than B. The larger the number, the larger the size of cracks is. Cut: crack became large to cut the test vulcanized sheet.

The flexing fatigue resistance was evaluated by producing a test piece by following the section 5.3 in the JIS-K6260, repeating bending by following the section 5.2.1, and counting the bending times until the test piece was cut. The larger the bending times is, the more superior in flexing fatigue resistance.

The oil resistance was evaluated by soaking the test vulcanized sheet in a test oil (IRM 903) adjusted at 100° C. by following the JIS-K6258, and obtaining the volume swelling degree ΔV (unit: %) after 70 hours. The less the volume swelling degree is, the more superior in oil resistance.

Example 2

Except for using a graft copolymer (D), wherein a content of an ethylene-propylene-unconjugated diene copolymer was 35%, produced by changing the use amount of an ethylene-propylene-unconjugated diene copolymer to 35 parts and the use amount of the mixture of styrene and acrylonitrile (styrene:acrylonitrile=30:20/weight ratio) to 65 parts, evaluation was made in the same way on ozone resistance, flexing fatigue resistance and oil resistance by using a vulcanized sheet produced in the same way as in the example 1. The results are shown in Table 1.

Example 3

Except for using a graft copolymer (D), wherein a content of an ethylene-propylene-unconjugated diene copolymer was 60%, produced by changing the use amount of an ethylene-propylene-unconjugated diene copolymer to 60 parts and the use amount of the mixture of styrene and acrylonitrile (styrene:acrylonitrile=30:20/weight ratio) to 40 parts, evaluation was made in the same way on ozone resistance, flexing fatigue resistance and oil resistance by using a vulcanized sheet produced in the same way as in the example 1. The results are shown in Table 1.

Example 4

Other than changing to 50 parts of the rubber (A), 15 parts of the rubber (B), 35 parts of the rubber (C) and 10 parts of the graft copolymer (D), evaluation was made in the same way on ozone resistance, flexing fatigue resistance and oil resistance by using a vulcanized sheet produced in the same way as in the example 1. The results are shown in Table 1.

Example 5

Other than using as the rubber (B) acrylonitrile-butadiene copolymer rubber having number average molecular weight of 10,000 obtained by changing the amount of tert-dodecylmercaptan to 12 parts, evaluation was made in the same way on ozone resistance, flexing fatigue resistance and oil resistance by using a vulcanized sheet produced in the same way as in the example 1. The results are shown in Table 1.

Comparative Example 1

Except for using a graft copolymer CD), wherein a content of an ethylene-propylene-unconjugated diene copolymer was 15%, produced by changing the use amount of an ethylene-propylene-unconjugated diene copolymer to 15 parts and the use amount of the mixture of styrene and acrylonitrile (styrene : acrylonitrile=30:20/weight ratio) to 85 parts, evaluation was made in the same way on ozone resistance, flexing fatigue resistance and oil resistance by using a vulcanized sheet produced in the same way as in the example 1. The results are shown in Table 1.

Comparative Example 2

Except for using a graft copolymer (D), wherein a content of an ethylene-propylene-unconjugated diene copolymer was 75%, produced by changing the use amount of an ethylene-propylene-unconjugated diene copolymer to 75 parts and the use amount of the mixture of styrene and acrylonitrile (styrene:acrylonitrile=30:20/weight ratio) to 25 parts, evaluation was made in the same way on ozone resistance, flexing fatigue resistance and oil resistance by using a vulcanized sheet produced in the same way as in the example 1. The results are shown in Table 1.

Comparative Example 3

Except that the graft copolymer (D) was not added, evaluation was made in the same way on ozone resistance, flexing fatigue resistance and oil resistance by using a vulcanized sheet produced in the same way as in the example 1. The results are shown in Table 1.

Comparative Example 4

Except that the rubber (B) was not added, evaluation was made in the same way on ozone resistance, flexing fatigue resistance and oil resistance by using a vulcanized sheet produced in the same way as in the example 1. The results are shown in Table 1.

TABLE 1

|  | Example | | | | | Comparative Example | | | |
|---|---|---|---|---|---|---|---|---|---|
|  | 1 | 2 | 3 | 4 | 5 | 1 | 2 | 3 | 4 |
| Content of Rubber (A) | 60 | 60 | 60 | 50 | 60 | 60 | 60 | 60 | 70 |
| Number Average Molecular Weight of Rubber (A) | 81000 | 81000 | 81000 | 81000 | 81000 | 81000 | 81000 | 81000 | 81000 |
| Content of Rubber (B) | 10 | 10 | 10 | 15 | 10 | 10 | 10 | 10 | 0 |
| Number Average Molecular Weight of Rubber (B) | 3000 | 3000 | 3000 | 3000 | 10000 | 3000 | 3000 | 3000 | 3000 |
| Content of Rubber (C) | 30 | 30 | 30 | 35 | 30 | 30 | 30 | 30 | 30 |
| Content of Graft Copolymer (D) | 5 | 5 | 5 | 10 | 5 | 5 | 5 | 0 | 5 |
| Content of EPDM in Craft Copolymar (D) | 50 | 35 | 60 | 50 | 50 | 15 | 75 | 0 | 50 |
| Ozone Resistance | | | | | | | | | |
| 72( hr) | NC | NC | NC | NC | NC | NC | NC | NC | NC |
| 144 (hr) | NC | NC | NC | NC | NC | NC | NC | A2 | A2 |
| 280 (hr) | NC | NC | NC | NC | NC | A1 | A1 | A2 | A2 |
| Flexing Fatigue Resistance | | | | | | | | | |
| Bending Times | 100000 | 80000 | 90000 | 150000 | 80000 | 40000 | 80000 | 80000 | 10000 |
| Oil Resistance | | | | | | | | | |
| Volume Swelling Degree Δ V(%) | 58 | 56 | 60 | 63 | 58 | 55 | 62 | 55 | 55 |

As shown in Table 1, the comparative example 1 using a graft copolymer (D), wherein a content of the ethylene-propylene-unconjugated diene copolymer was below the range of the present invention, was confirmed to have excellent oil resistance, but the ozone resistance and the flexing fatigue resistance were not sufficient. Also, the comparison example 2 using a graft copolymer (D), wherein a content of the ethylene-propylene-unconjugated diene copolymer was above the range of the present invention, was confirmed to have excellent flexing fatigue resistance, but oil resistance and ozone resistance were insufficient.

Furthermore, it was confirmed that the comparative example 3 not including the graft copolymer (D) exhibited poor ozone resistance, and the comparative example 4 not including the rubber (B) exhibited poor ozone resistance and flexing fatigue resistance.

On the other hand, the examples 1 to 5, wherein the content of the ethylene-propylene-unconjugated diene copolymer was within the range of the present invention, were confirmed to have excellently balanced ozone resistance, flexing fatigue resistance and oil resistance.

The embodiments explained above are for easier understanding of the present invention and not to limit the present invention. Accordingly, respective elements disclosed in the above embodiments includes all modifications in designs and equivalents belonging to the technical field of the present invention.

What is claimed is:

1. A rubber composition, including
α,β-ethylenically unsaturated nitrile-conjugated diene copolymer rubber (A) having number average molecular weight of 50,000 to 150,000, and a content of α,β-ethylenically unsaturated nitrile monomer units of 28 to 50 wt %,
α,β-ethylenically unsaturated nitrile-conjugated diene copolymer rubber (B) having number average molecular weight of 1,000 to 20,000,
ethylene-α-olefin copolymer rubber (C), and
a graft copolymer (D),
wherein
said graft copolymer (D) is obtained by performing graft copolymerization on a mixture of an aromatic vinyl compound and an α,β-ethylenically unsaturated nitrile monomer with an ethylene-propylene-unconjugated copolymer, and a content of structure units of said ethylene-propylene-unconjugated copolymer is 20 to 70 wt %;
a ratio of the graft copolymer (D) with respect to 100 parts by weight in total of said rubber (A), rubber (B) and rubber (C) is 1 to 30 parts by weight; and
a composition ratio of the rubber (A), rubber (B) and rubber (C) is
rubber (A): 20 to 79 wt %,
rubber (B): 1 to 30 wt %, and
rubber(C): 20 to 50 wt %.

2. The rubber composition as set forth in claim 1, further including a vulcanizing agent.

3. The rubber composition as set forth in claim 1, wherein the composition ratio of rubber (A), rubber (B) and rubber (C) is
rubber (A): 40 to 70 wt %,
rubber (B): 5 to 15 wt %, and
rubber (C): 25 to 45 wt %.

4. The rubber composition as set forth in claim 1, wherein the content of structure units of said ethylene-propylene-unconjugated copolymer in the graft copolymer (D) is 25 to 65 wt %.

5. The rubber composition as set forth in claim 1, wherein the content of structure units of said ethylene-propylene-unconjugated copolymer in the graft copolymer (D) is 30 to 60 wt %.

6. The rubber composition as set forth in claim 1, wherein the ratio of the graft copolymer (D) with respect to 100 parts by weight in total of said rubber (A), rubber (B) and rubber (C) is 2 to 20 parts by weight.

7. The rubber composition as set forth in claim 1, wherein the ratio of the graft copolymer (D) with respect to 100 parts by weight in total of said rubber (A), rubber (B) and rubber (C) is 3 to 15 parts by weight.

8. The rubber composition as set forth in claim 1, wherein the vulcanizing agent is a sulfur-based vulcanizing agent selected from the group consisting of precipitated sulfur, 4,4'-dithiomorpholine, tetramethylthiram disulfide, tetraethylthiram disulfide, polymer polysulfide and other organic sulfur compounds.

9. The rubber composition as set forth in claim 1, wherein the vulcanizing agent is an organic peroxide selected from the group consisting of dialkyl peroxides, diacyl peroxides, peroxyesters, dicumyl peroxide, di-t-butyl peroxide, 2,5-dimethyl-2,5-di(t-butyl peroxy)-3-hexine, 2,5-dimethyl-2,5-di(t-butyl peroxy)hexane, 1,3-bis(t-butyl peroxyisopropyl) benzene, benzoyl peroxide, isobutyl peroxide, 2,5-dimethyl-2,5-bis(benzoyl peroxy)hexane, and t-butyl peroxyisopropyl carbonate.

10. The rubber composition as set forth in claim 1, wherein the vulcanizing agent is a polyamine-based vulcanizing agent selected from the group consisting of hexamethylene diamine, hexamethylene diamine carbamate, tetramethylene pentamine, hexamethylene diamine-cinnamaldehyde addition product, hexamethylene diamine-dibenzoate salt, 4,4'-methylene dianiline, 4,4'-oxydiphenylamine, m-phenylenediamine, p-phenylenediamine, 4,4'-methylene bis(o-chloroaniline), dihydrazide isophthalate, adipic acid dihydrazide and sebacic acid dihydrazide.

* * * * *